(12) United States Patent
Okamoto et al.

(10) Patent No.: US 7,850,377 B2
(45) Date of Patent: Dec. 14, 2010

(54) MOUNTING STRUCTURE FOR PLURALITY OF LENSES, CAMERA MODULE, AND ELECTRONIC EQUIPMENT

(75) Inventors: Hideo Okamoto, Tokyo (JP); Nobuyuki Adachi, Tokyo (JP); Noritoshi Eguchi, Saitama (JP)

(73) Assignee: Sony Corporation, Tokyo (JP)

( * ) Notice: Subject to any disclaimer, the term of this patent is extended or adjusted under 35 U.S.C. 154(b) by 233 days.

(21) Appl. No.: 12/099,939

(22) Filed: Apr. 9, 2008

(65) Prior Publication Data

US 2009/0047011 A1 Feb. 19, 2009

(30) Foreign Application Priority Data

Apr. 12, 2007 (JP) .............................. 2007-104664

(51) Int. Cl.
*G03B 17/00* (2006.01)
*G02B 7/02* (2006.01)
(52) U.S. Cl. ...................................... 396/529; 359/819
(58) Field of Classification Search ................. 396/529; 348/360, 373–376; 359/355, 362–366, 379, 359/796, 797, 819, 821
See application file for complete search history.

(56) References Cited

U.S. PATENT DOCUMENTS

| | | | | |
|---|---|---|---|---|
| 3,897,133 A | * | 7/1975 | Warner et al. | 359/365 |
| 5,570,237 A | * | 10/1996 | Sato | 359/797 |
| 6,819,508 B2 | * | 11/2004 | Chiang | 359/796 |
| 7,196,855 B2 | * | 3/2007 | Yamaguchi | 359/785 |

FOREIGN PATENT DOCUMENTS

JP  2006-301672  11/2006

* cited by examiner

*Primary Examiner*—W. B. Perkey
*Assistant Examiner*—Minh Q Phan
(74) *Attorney, Agent, or Firm*—SNR Denton US LLP (57) ABSTRACT

A mounting structure for a plurality of lenses, wherein at least three lenses are arranged with their optical axes set to coincide with each other, the lenses located at both ends in the optical axis direction are provided with parts facing each other, and the mutually facing parts of the lenses are fixed to each other with an adhesive. The mounting structure, wherein all the lenses except the lenses located at both ends in the optical axis direction are fixed in the state of being clamped between the lenses located at both ends in the optical axis direction by shrinkage during curing of the adhesive.

13 Claims, 6 Drawing Sheets

MOUNTING STRUCTURE FOR PLURALITY OF LENSES, CAMERA MODULE, AND ELECTRONIC EQUIPMENT

CROSS REFERENCES TO RELATED APPLICATIONS

The present invention contains subject matter related to Japanese Patent Application JP 2007-104664 filed with the Japan Patent Office on Apr. 12, 2007, the entire contents of which being incorporated herein by reference.

BACKGROUND OF THE INVENTION

1. Field of the Invention

The present invention relates to a mounting structure for a plurality of lenses, a camera module, and an electronic equipment.

2. Description of the Related Art

Electronic equipments such as imaging apparatus with a plurality of lenses incorporated therein have been provided.

In such electronic equipments, a mounting structure has been adopted in which the plurality of lenses are attached to a tubular member such as a lens-barrel provided as other member than the lenses and the tubular member is mounted to a casing or frame of the electronic equipment (refer to Japanese Patent Laid-open No. 2006-301672).

SUMMARY OF THE INVENTION

In recent years, there has been a demand for downsizing of such electronic equipments in which a plurality of lenses are incorporated, and, accordingly, there has been a request for a further downsizing of the structure for mounting a plurality of lenses.

However, the above-mentioned mounting structure in which a plurality of lenses are mounted by use of a tubular member such as a lens-barrel is disadvantageous from the viewpoint of downsizing, since the tubular member used in the structure occupies much space.

Thus, there is a need for a mounting structure for a plurality of lenses which is advantageous from the viewpoint of downsizing, a camera module using the mounting structure, and an electronic equipment including the camera module.

According to one embodiment of the present embodiment, there is provided a mounting structure for a plurality of lenses. At least three lenses are arranged with their optical axes set to coincide with each other, the lenses located at both ends in the optical axis direction are provided with parts facing each other, the mutually facing parts of the lenses are fixed to each other with an adhesive, and all the lenses except the lenses located at both ends in the optical axis direction are fixed in the state of being clamped between the lenses located at both ends in the optical axis direction by shrinkage during curing of the adhesive.

According to another embodiment of the present invention, there is provided a camera module including: an imaging device; and an imaging optical system for guiding an image of an object to the imaging device. The imaging optical system includes at least three lenses, the at least three lenses are arranged with their optical axes set to coincide with each other, the lenses located at both ends in the optical axis direction are provided with parts facing each other, and the mutually facing parts are fixed to each other with an adhesive. All the lenses except the lenses located at both ends in the optical axis direction are fixed in the state of being clamped between the lenses located at both ends in the optical axis direction by shrinkage during curing of the adhesive.

According to a further embodiment of the present embodiment, there is provided an electronic equipment including a camera module incorporated. The camera module includes: an imaging device, and an imaging optical system for guiding an image of an object to the imaging device, the imaging optical system includes at least three lenses; the at least three lenses are arranged with their optical axes set to coincide with each other; the lenses located at both ends in the optical axis direction are provided with parts facing each other; and the mutually facing parts are fixed to each other with an adhesive. All the lenses except the lenses located at both ends in the optical axis direction are fixed in the state of being clamped between the lenses located at both ends in the optical axis direction by shrinkage during curing of the adhesive.

According to the embodiments of the present embodiment as above, all the lenses except the lenses located at both ends in the optical axis direction are fixed in the state of being clamped between the lenses located at both ends in the optical axial direction by shrinkage during curing of the adhesive.

Therefore, the tubular member which has been demanded in the related art as an exclusive-use member for holding the lenses can be omitted according to the present embodiment.

Accordingly, the space which would be occupied by such a tubular member can be cut down, which is advantageous from the viewpoint of downsizing.

DETAILED DESCRIPTION OF THE PREFERRED EMBODIMENTS

First Embodiment

First of all, the electronic equipment 100 which includes a camera module 10 incorporated therein based on an application of the mounting structure for a plurality of lenses according to the present embodiment will be described below.

Figures 1A, 1B:
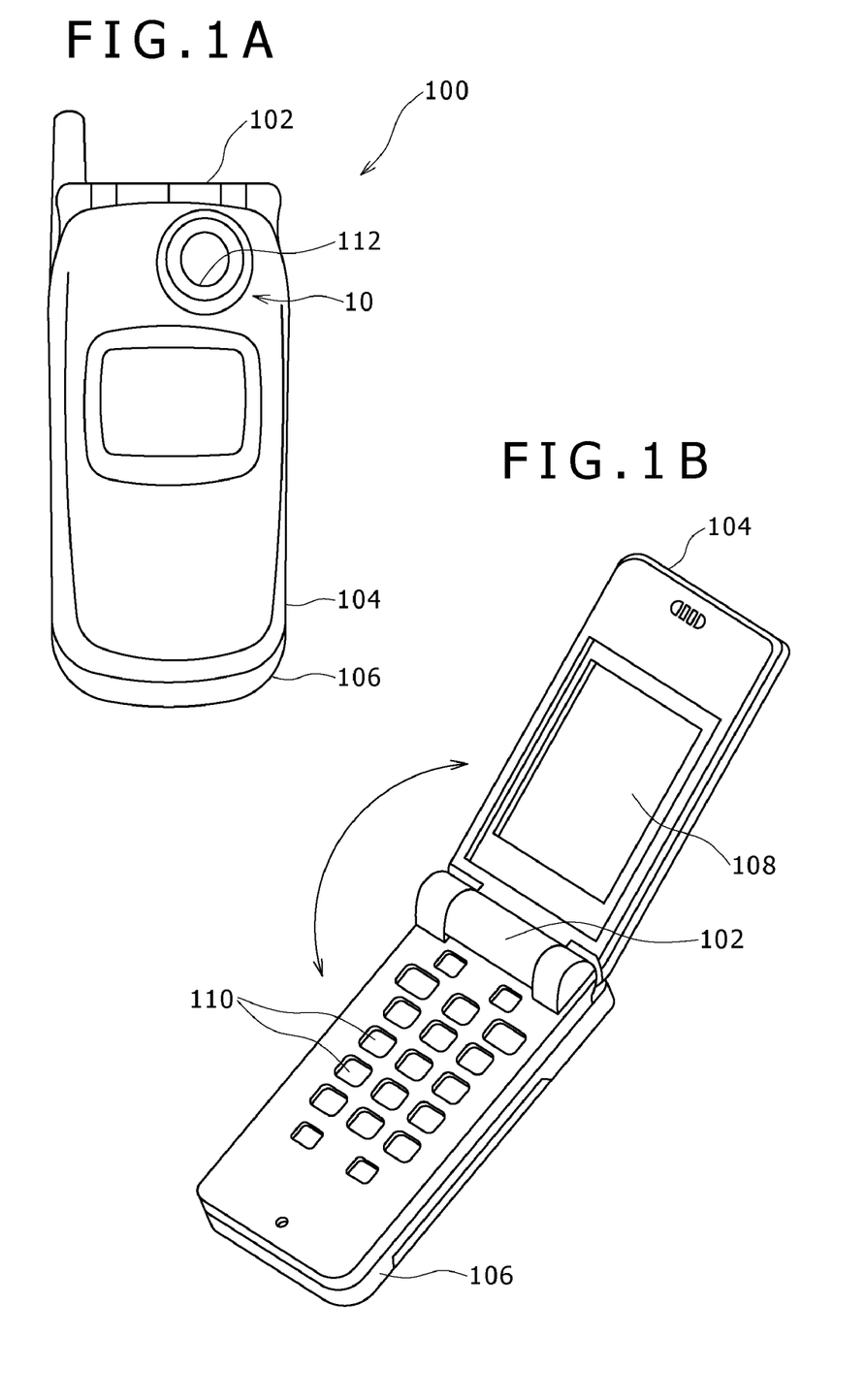
FIGS. 1A and 1B illustrate an example of the electronic equipment which includes incorporated a camera module according to a first embodiment of the present invention.

FIGS. 1A and 1B illustrate an example of an electronic equipment 100 which includes the camera module 10 incorporated therein according to the first embodiment, wherein FIG. 1A shows the appearance of the electronic equipment 100 in the condition where a first casing 104 is closed to overlap with a second casing 106, and FIG. 1B shows the appearance of the electronic equipment 100 in the condition where the first casing 104 is opened in relation to the second casing 106.

As shown in FIGS. 1A and 1B, in this embodiment, the electronic equipment 100 with the camera module 10 incorporated therein is a cellular phone.

The electronic equipment 100 has the first and second casings 104, 106 swingably linked to each other through a hinge part 102.

A display 108 including a liquid crystal display panel or the like is provided at the inside surface of the first casing 104, and an operating part 110 including ten-keys, function keys, etc. is provided at the inside surface of the second casing 106.

The camera module 10 is incorporated in a base end part of the first casing 104 so that an image picked up by an imaging apparatus 100 is displayed on the display 108.

In FIG. 1A, symbol 112 denotes a lens cover formed from a transparent material and provided on the front side of a lens 12 (see FIG. 2) of the camera module 10 mounted in the first casing 104.

Figure 2:
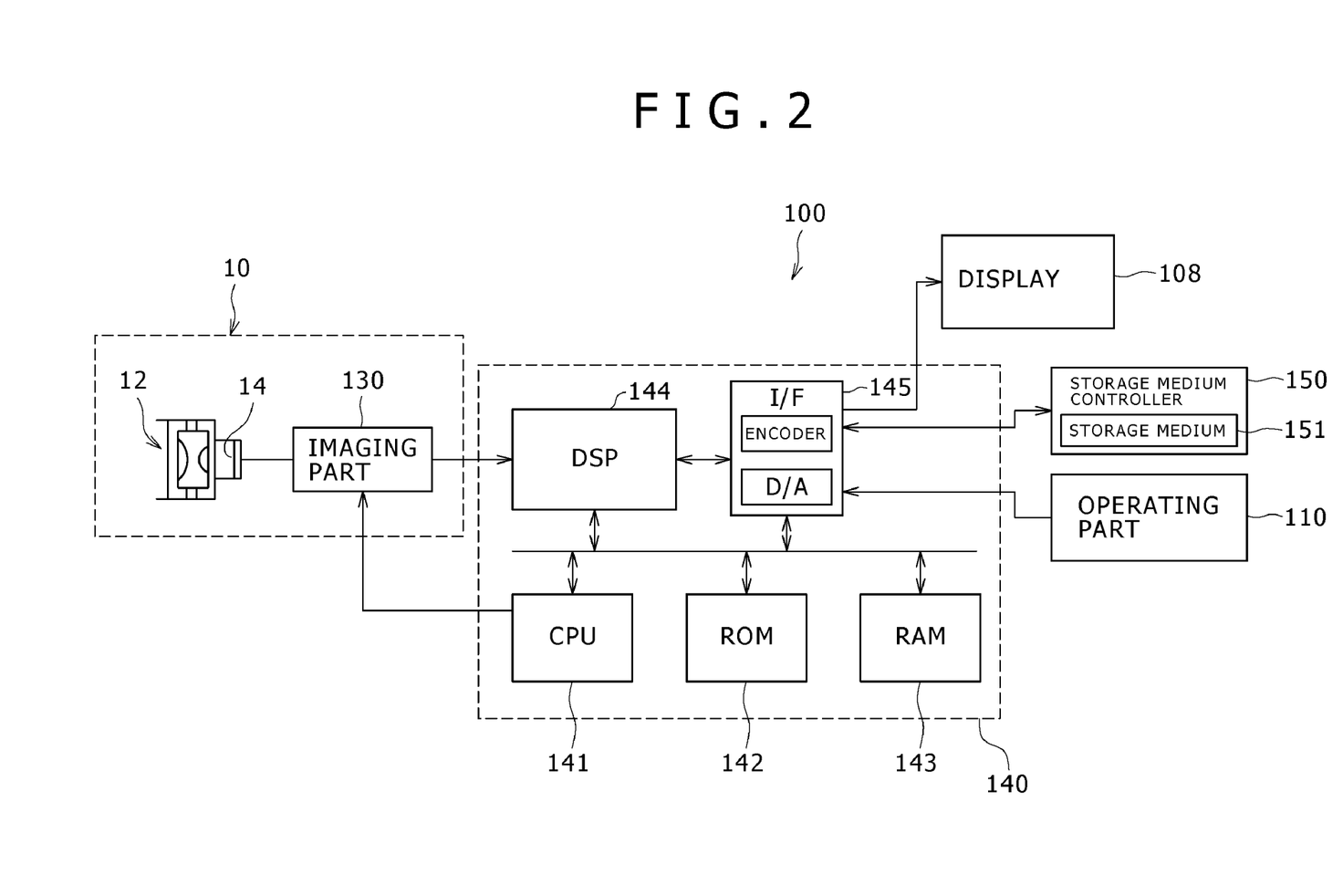
FIG. 2 is a block diagram of a control system in the electronic equipment.

FIG. 2 is a block diagram of a control system of the electronic equipment 100.

The electronic equipment 100 includes a system control unit 140, a storage medium controller 150 and the like, in addition to the camera module 10, the display 108, the operating part 110.

Figure 3:
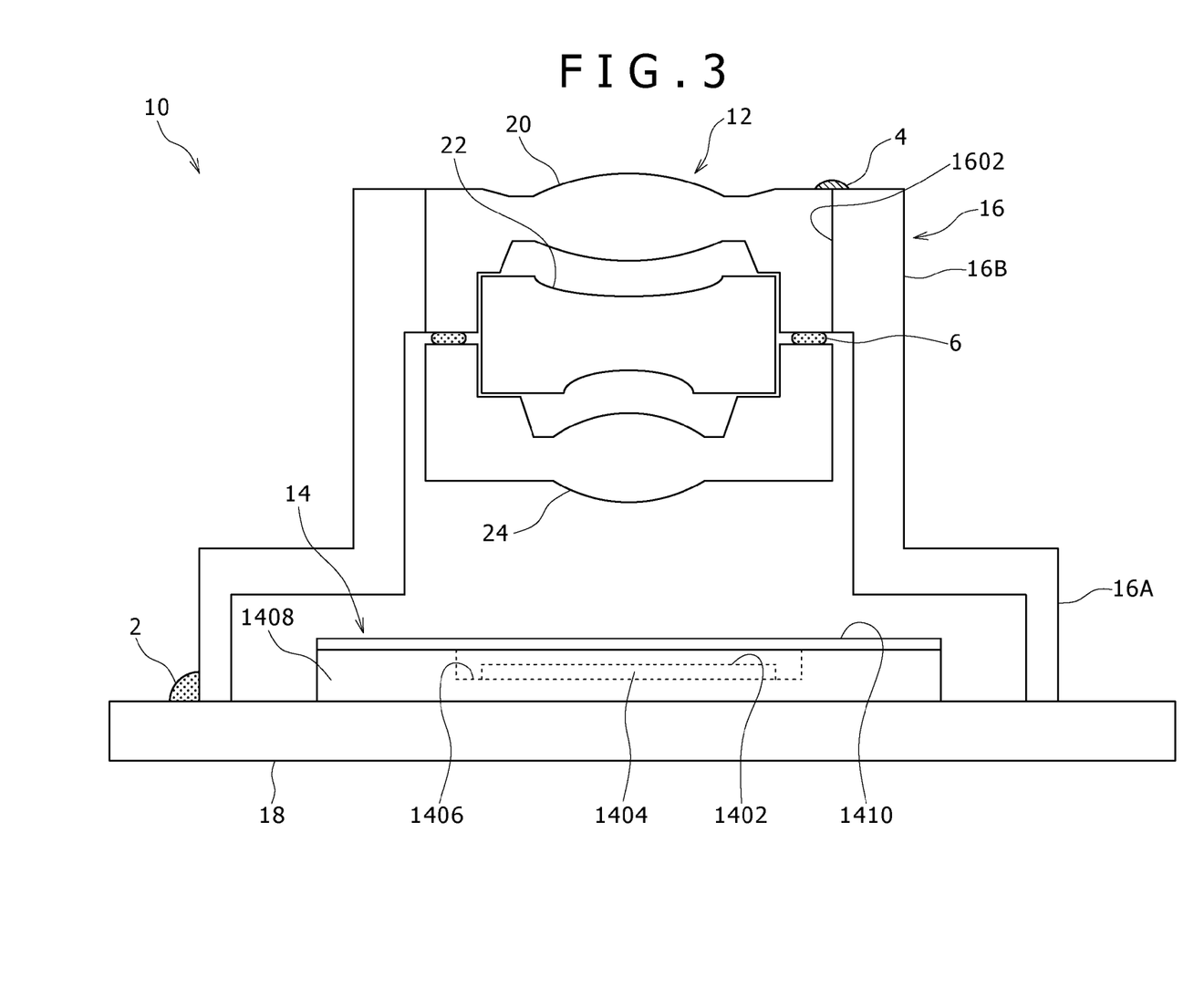
FIG. 3 is a sectional view of the camera module.

The camera module 10 includes an imaging part 130, which is mounted on a substrate 18 (see FIG. 3).

The imaging part 130 is so configured as to output an image signal, obtained by imaging (shooting) an object by an imaging device 14 in the camera module 10, to the system control unit 140 mounted on a main substrate.

Specifically, the imaging part 130 subjects an output signal from the imaging device 14 to such treatments as AGC (automatic gain control), OB (optical black) clamp and CDS (correlation double sampling), thereby generating a digital image signal, and outputs the digital image signal to the system control unit 140.

The system control unit 140 includes a CPU 141, a ROM 142, a RAM 143, a DSP 144, an external interface 145, and the like.

The CPU 141 sends instructions to individual parts of the electronic equipment 100 by using the ROM 142 and the RAM 143, so as to control the system as a whole.

In addition, the CPU 141 monitors an input signal from the operating part 110, and executes various operation controls based on the contents of the input.

The DSP 144 subjects the image signal from the imaging part 130 to various signal treatments, to thereby generate a video signal (e.g., YUV signal or the like) of a static image or dynamic image conforming to a predetermined format.

The external interface 145 includes various encoders and D/A converters, for exchange of various control signals and data with external elements (in this example, the display 108, the operating part 110, and a storage medium 151) connected to the system control unit 140.

The storage medium controller 150 records the video signal of the still image or dynamic image outputted from the system controller 140 in the storage medium 151 as image data, and reads image data from the storage medium 151 so as to supply the image data to the system controller 140.

The storage medium 151 is, for example, an incorporated memory which is unremovably incorporated in the electronic equipment 100, or a memory card which is detachably attached through a memory slot (not shown) provided in the electronic equipment 100.

Now, the configuration of the camera module 10 will be described in detail below.

Figure 4:
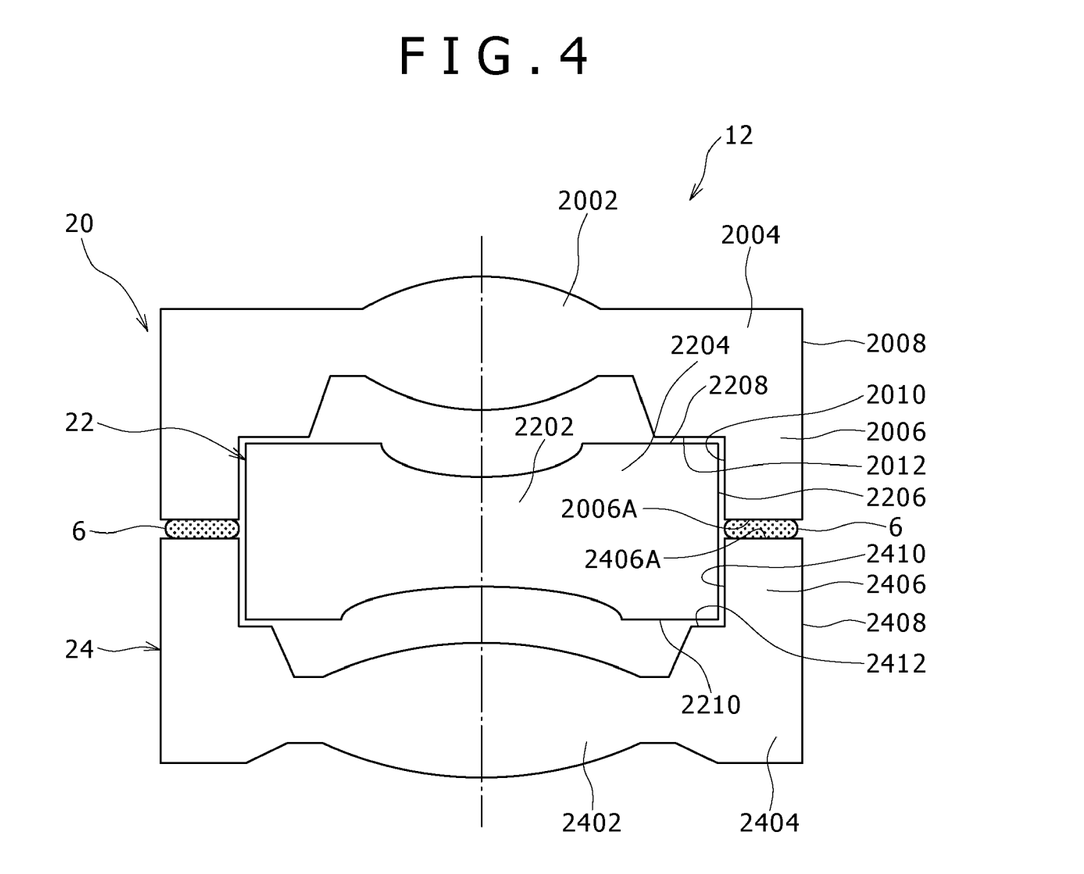
FIG. 4 is a sectional view showing a lens mounting structure.

FIG. 3 is a sectional view of the camera module 10, and FIG. 4 is a sectional view showing the lens mounting structure.

The camera module 10 includes lenses 12, the imaging device 14, a holder 16, and a substrate 18.

As shown in FIG. 3, the imaging device 14 is mounted on the substrate 18.

The imaging device 14 is a device for generating an image signal by picking up an image of an object guided through the lenses 12 constituting an imaging optical system.

Examples of devices that can be used as the imaging device 14 include a CCD, a C-MOS sensor, and other various known imaging devices.

In many cases, the imaging device 14 includes a device body 1404 provided with an imaging surface 1402 to which the image of an object is guided, a package 1408 including an accommodating recess 1406 for accommodating the device body 1404, and a transparent cover glass 1410 closing the accommodating recess 1406 so as to cover the imaging surface 1402.

A bottom surface of the package 1408 is attached to a front surface of the substrate 18 with an adhesive 2, and connection terminals exposed at the bottom surface of the package 1408 or at a lower part of a side surface of the package 1408 are connected to connection terminals at the front surface of the substrate 18 by soldering.

As shown in FIG. 3, the holder 16 is so provided as to cover the package 1408 in which the imaging device 14 is accommodated.

The holder 16 is attached to the substrate 18 with an adhesive.

The holder 16 includes a lower large diameter part 16A attached to the substrate 18 and surrounding the package 1408, and an upper small diameter part 16B continuous with the lower large diameter part 16A.

The lenses 12 are attached to the upper small diameter part 16B with an adhesive 4.

As shown in FIG. 4, in this embodiment, the lenses 12 includes three lenses, namely, a first lens 20, a second lens 22, and a third lens 24.

The first lens 20 has a lens part 2002, and an outer peripheral part 2004 continuous with the outer periphery of the lens part 2002.

At the portion where the outer peripheral part 2004 fronts on the imaging device 14 side, a cylindrical part 2006 projecting toward the imaging device 14 is provided.

The outer peripheral surface of the outer peripheral part 2004 and the outer peripheral surface of the cylindrical part 2006 are together formed as an outer peripheral surface 2008 composed of a single cylindrical surface with the optical axis as a center line.

The inner peripheral surface of the cylindrical part 2006 is formed as an engaging surface 2010 composed of a cylindrical surface with the optical axis as a center line. The engaging surface 2010 engages with the second lens 22 so as to cause the optical axes of the first lens 20 and the second lens 22 to coincide with each other.

In addition, an abutting surface 2012 continuous with the engaging surface 2010 is formed at a boundary portion between the engaging surface 2010 of the cylindrical part 2006 and the outer peripheral part 2004. The abutting surface 2012 extends on a plane orthogonal to the optical axis. The abutting surface 2012 is a portion on which the second lens 22 abuts in the optical axis direction.

The second lens 22 has a lens part 2202, and an outer peripheral part 2204 continuous with the outer periphery of the lens part 2202.

The outer peripheral surface of the outer peripheral part 2204 is formed as an engaging surface 2206 composed of a cylindrical surface with the optical axis as a center line. The engaging surface 2206 can engage with the engaging surface 2010 of the first lens 20, and engagement between the engaging surfaces 2010 and 2206 ensures that the optical axes of the first lens 20 and the second lens 22 coincide with each other.

One of end faces of the outer peripheral part 2204 is formed as an abutting surface 2208 which extends on a plane orthogonal to the optical axis. This abutting surface 2208 can abut on the abutting surface 2012 of the first lens 20.

The other end face of the outer peripheral part 2204 is formed as an abutting surface 2210 which extends on a plane orthogonal to the optical axis. This abutting surface 2210 is a portion for abutment on the third lens 24.

The third lens 24 has a lens part 2402, and an outer peripheral part 2404 continuous with the outer periphery of the lens part 2402.

At a portion where the outer peripheral part 2404 fronts on the second lens 22, a cylindrical part 2406 projecting toward the second lens 22 is provided.

The outer peripheral surface of the outer peripheral part 2404 and the outer peripheral surface of the cylindrical part 2406 are together formed as an outer peripheral surface 2408 composed of a single cylindrical surface with the optical axis as a center line. In this embodiment, the outer peripheral surface 2408 is formed in the same size as the outer peripheral surface 2008 of the first lens 20.

The inner peripheral surface of the cylindrical part 2406 is formed as an engaging surface 2410 composed of a cylindrical surface with the optical axis as a center line. The engaging surface 2410 engaged with the engaging surface 2206 of the second lens 22 so as to cause the optical axes of the second lens 22 and the third lens 24 to coincide with each other.

In addition, an abutting surface 2412 continuous with the engaging surface 2410 is formed at a boundary portion between the engaging surface 2410 of the cylindrical part 2406 and the outer peripheral surface 2404. The abutting surface 2412 extends on a plane orthogonal to the optical axis. This abutting surface 2412 can abut on the abutting surface 2210 of the second lens 22.

Incidentally, the size between the abutting surfaces 2208 and 2210 of the second lens 22 is set to be larger than the sum of the sizes of the engaging surfaces 2010 and 2410 measured along the optical axis so that, when the abutting surfaces 2012 and 2412 of the first and third lenses 20 and 24 abut respectively on the abutting surfaces 2208 and 2210 of the second lens 22, a gap is secured between tip faces 2006A and 2406A of the cylindrical parts 2006 and 2406 of the first and third lenses 20 and 24.

Incidentally, the tip faces 2006A and 2406A of the cylindrical parts 2006 and 2406 extend respectively on planes orthogonal to the optical axis.

In this embodiment, the parts of the cylindrical parts 2006, 2406 including the tip faces 2006A, 2406A correspond to the annular plate parts set forth in the claims.

Besides, the outside diameters of the first and third lenses 20, 24 located at both ends in the optical axis direction are set to be greater than the outside diameter of the second lens 22 which is fixed in the state of being clamped between the first and third lenses 20, 24.

The first, second and third lenses 20, 22 and 24 are fixed with an adhesive 6 in the condition where their optical axes coincide with each other, without using any cylindrical member that has been used in the related art for exclusive use for holding the lenses.

More specifically, the second lens 22 is mounted to the first lens 20 in the condition where the engaging surfaces 2010 and 2206 are engaged with each other and the abutting surfaces 2012 and 2208 are abutting on each other.

In addition, the third lens 24 is mounted to the second lens 22 in the condition where the engaging surfaces 2206 and 2410 are engaged with each other and the abutting surfaces 2210 and 2412 are abutting on each other.

Then, the thus mounted condition of the first, second, and third lenses 20, 22, and 24 is held by use of an appropriate jig.

Next, a UV-curing adhesive 6 as the adhesive 6 is loaded between the tip faces 2006A, 2406A of the cylindrical parts 2006, 2406 which face each other. Incidentally, the portions where the UV-curing adhesive 6 is applied are a plurality of portions, for example, two portions, spaced from each other along the circumferential direction of the tip faces 2006A, 2406A.

Subsequently, the UV-curing adhesive 6 is irradiated with UV rays.

When the UV-curing adhesive 6 is cured, the volume of the UV-curing adhesive 6 contracts. Due to this shrinkage during curing, the first and third lenses 20 and 24 are pulled toward each other along the optical axis.

As a result, the second lens 22 is fixed in the state of being clamped between the first lens 20 and the third lens 24 through the abutting surfaces 2012, 2208, 2210, 2412.

Of the thus united first, second and third lenses 20, 22, and 24, for example, the outer peripheral surface 2008 of the first lens 20 is fitted in an upper inner peripheral surface 1602 of the upper small diameter part 16B of the holder 16, and is attached to the upper small diameter part 16B with an adhesive 4.

Incidentally, in this embodiment, the first, second and third lenses 20, 22, and 24 and the UV-curing adhesive 6 constitute the mounting structure for a plurality of lenses based on the present embodiment.

According to the present embodiment, the following advantages are obtained, as compared with the structure according to the related art in which an exclusive-use tubular member for holding the lenses is used.

Since the exclusive-use tubular member for holding the lenses can be omitted, the space that has been occupied by such a tubular member can be cut down, which is advantageous from the viewpoint of downsizing. Especially, in cellular phones, there is a tendency toward downsizing of the cellular phones themselves, and a camera module 10 need to be mounted into a limited space; therefore, the omission of the tubular member for exclusive use is advantageous in realizing a camera module 10 preferable for cellular phones.

In addition, the space that has been occupied by the tubular member in the related art can be used as a space for disposing the holder 16, which is advantageous from the viewpoint of effective utilization of space.

Further, since the tubular member is unnecessary, the number of component parts can be reduced, which is advantageous from the viewpoint of reducing the cost of the camera module 10.

Besides, it might be contemplated to adhere the adjacent lenses 20, 22, 24 to each other by use of an adhesive. Specifically, it might be contemplated to adhere the first lens 20 and the second lens 22 to each other with an adhesive, and to adhere the second lens 22 and the third lens 24 to each other with an adhesive.

In this case, assuming that the adjacent lenses are adhered by applying the adhesive to two portions arranged along the circumferential direction, it is demanded to apply the adhesive to a total of four portions and to irradiate the adhesive with UV rays at the four positions.

In this embodiment, on the other hand, the three lenses 20, 22, 24 can be fixed by only applying an adhesive to a total of two portions and irradiating the adhesive with UV rays at the two positions; thus, the number of the steps necessary for mounting the lenses is halved, as compared with the just-contemplated case.

The manufacture of the camera module 10 is ordinarily carried out on the basis (unit) of 1,000 modules or 5,000 modules or 10,000 modules. Therefore, according to the present embodiment, the number of steps needed for mounting the lenses can be reduced remarkably, which is extremely advantageous in reducing the cost of the camera module 10.

Incidentally, the number of steps of applying the adhesive and the number of steps of irradiation with UV rays remain constant even upon an increase in the number of lenses clamped between the lenses located at both ends in the optical axis direction, and, therefore, the above-mentioned effect becomes more remarkable as the number of lenses clamped between the lenses located at both ends in the optical axis direction is increased.

Second Embodiment

Now, a second embodiment of the present invention will be described below.

Figure 5:
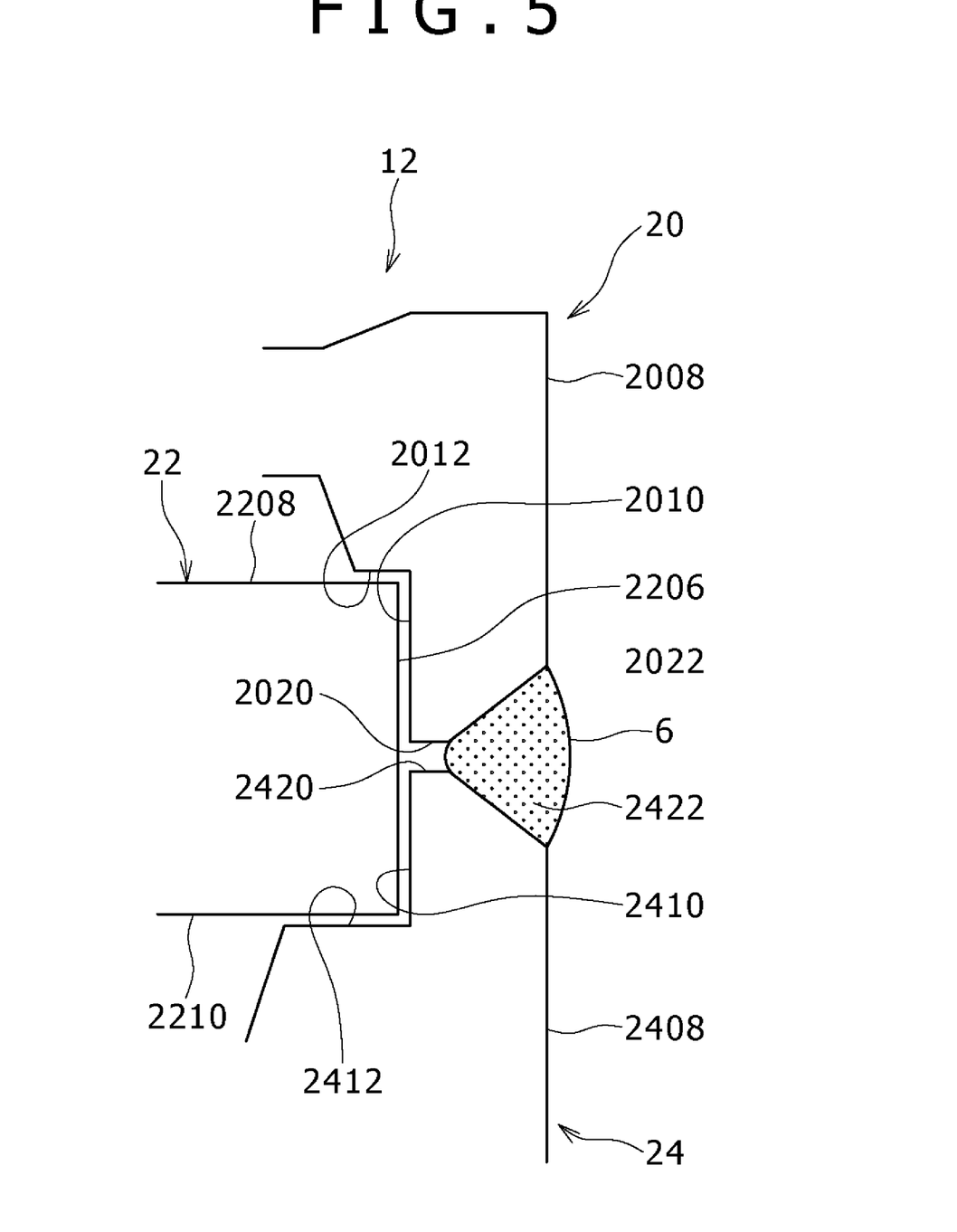
FIG. 5 illustrates an essential part of the lens mounting structure according to a second embodiment of the present invention.

FIG. 5 illustrates an essential part of a lens mounting structure according to the second embodiment.

Denoting the same members and parts as those in the first embodiment by the same reference symbols used above, in the second embodiment the mutually facing parts of first and third lenses 20 and 24 fixed with a UV-curing adhesive 6 include plain surfaces 2020, 2420 extending in planes orthogonal to the optical axis and facing each other, and inclined surfaces 2022, 2422 displaced in such directions as to become farther from each other as one goes outwards in the radial direction of the first and third lenses 20, 24 from those end parts of the plain surfaces 2020, 2420 which are located on the outer side in the radial direction of the first and third lenses 20, 24.

When the mutually facing parts of the first and third lenses 20, 24 fixed with the UV-curing adhesive 6 are formed by use of the inclined surfaces 2022, 2422, the operation of applying the UV-curing adhesive 6 becomes easier to carry out, which is advantageous from the viewpoint of enhancing the working efficiency.

Third Embodiment

Now, a third embodiment of the present invention will be described below.

Figure 6:
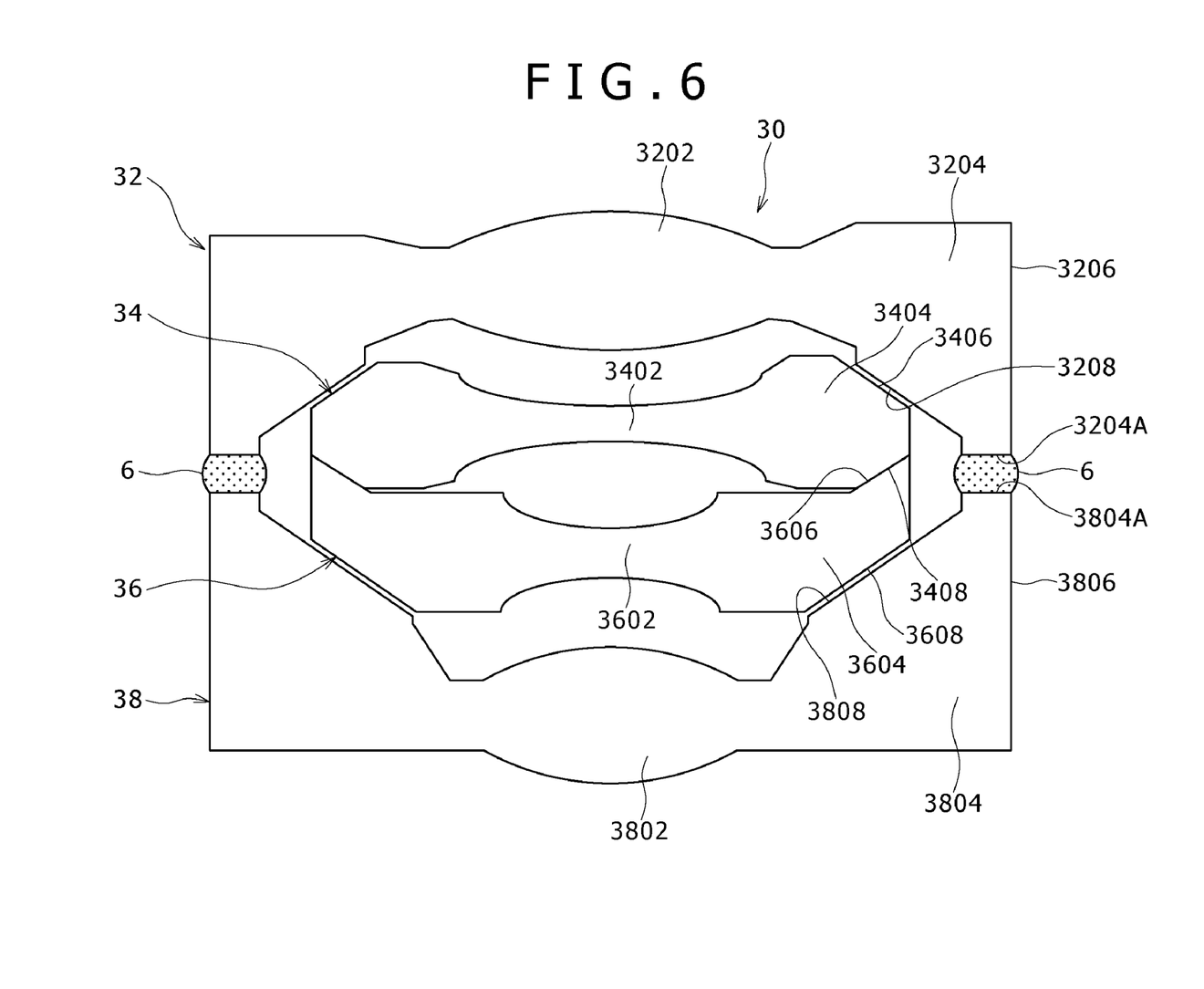
FIG. 6 is a sectional view showing a lens mounting structure according to a third embodiment of the present invention.

FIG. 6 is a sectional view showing a lens mounting structure according to the third embodiment.

The third embodiment differs from the first embodiment in that two lenses are fixed in the state of being clamped between the lenses located at both ends in the optical axis direction.

Lenses 30 in this embodiment consist of four lenses, namely, a first lens 32, a second lens 34, a third lens 36, and a fourth lens 38.

The first lens 32 has a lens part 3202, and an outer peripheral part 3204 continuous with the outer periphery of the lens part 3202.

The outer periphery of the outer peripheral part 3204 is formed as an outer peripheral surface 3206 composed of a cylindrical surface with the optical axis as a center line.

At a portion which is located on the inner side of the outer peripheral surface 3206 and at which the outer peripheral part 3204 fronts on the imaging device 14 side, an engaging surface 3208 composed of a conical surface with the optical axis as a center line is provided. The engaging surfaces 3208 engages with the second lens 34 so as to cause the optical axes of the first lens 32 and the second lens 34 to coincide with each other, and is a portion on which the second lens 34 abuts in the optical axis direction.

The second lens 34 has a lens part 3402, and an outer peripheral part 3404 continuous with the outer periphery of the lens part 3402.

One of end faces of the outer peripheral part 3404 is provided with an engaging surface 3406 which can engage with the engaging surface 3208 of the first lens 32.

The other end face of the outer peripheral part 3404 is provided with an engaging surface 3408 composed of a conical surface with the optical axis as a center line. The engaging surface 3408 engages with the third lens 36 so as to cause the optical axes of the second lens 34 and the third lens 36 to coincide with each other, and is a portion on which the third lens 36 abuts in the optical axis direction.

The third lens 36 has a lens part 3602, and an outer peripheral part 3604 continuous with the outer periphery of the lens part 3602.

One of end faces of the outer peripheral part 3604 is provided with an engaging surface 3606 which can engage with the engaging surface 3408 of the second lens 34.

The other end face of the outer peripheral part 3604 is provided with an engaging surface 3608 composed of a conical surface with the optical axis as a center line. The engaging surface 3608 engages with the fourth lens 38 so as to cause the optical axes of the third lens 36 and the fourth lens 38 to coincide with each other, and is a portion on which the fourth lens 38 abuts in the optical axis direction.

The fourth lens 38 has a lens part 3802, and an outer peripheral part 3804 continuous with the outer periphery of the lens part 3802.

The outer periphery of the outer peripheral part 3804 is formed as an outer peripheral surface 3806 composed of a cylindrical surface with the optical axis as a center line. In this embodiment, the outer peripheral surface 3806 is formed in the same size as the outer peripheral surface 3206 of the first lens 32.

At a portion which is located on the inner side of the outer peripheral surface 3806 and at which the outer peripheral part 3804 fronts on the third lens 36, an engaging surface 3808 which can engage with the engaging surface 3608 is formed.

Incidentally, the parts of the lenses are so formed that when the second lens 34 and the third lens 36 are disposed between the first lens 32 and the fourth lens 38 in the condition where the engaging surfaces 3208, 3406, 3408, 3606, 3608, 3808 are engaged with each other, a gap is secured between tip faces 3204A and 3804A of the outer peripheral parts 3204 and 3804 of the first and fourth lenses 32 and 38 on the outer side in the radial direction of the second and third lenses 34 and 36.

Incidentally, the tip faces 3204A, 3804A of the outer peripheral surfaces 3204, 3804 extend respectively in planes orthogonal to the optical axis.

In this embodiment, the parts of the outer peripheral parts 3204, 3804 including the tip faces 3204A, 3804A correspond to the annular plate parts as set forth in the claims.

In addition, the outside diameters of the first and fourth lenses 32, 38 located at both ends in the optical axis direction are set to be larger than the outside diameters of the second and third lenses 34, 36 fixed in the state of being clamped between the lenses 32, 38.

The first, second, third and fourth lenses 32, 34, 36 and 38 are fixed by an adhesive with their optical axes coinciding with each other, without using any tubular member that has been used in the related art for exclusive use for holding the lenses.

More specifically, the second lens 34 is mounted to the first lens 32 by engaging the engaging surfaces 3208, 3406 with each other.

In addition, the third lens 36 is mounted to the second lens 34 by engaging the engaging surfaces 3408, 3606 with each other.

Besides, the fourth lens 38 is mounted to the third lens 36 by engaging the engaging surfaces 3608, 3808 with each other.

The thus mounted condition of the first, second, third, and fourth lenses 32, 34, 36, and 38 is held by use of an appropriate jig.

Next, a UV-curing adhesive 6 is loaded between the tip faces 3204A, 3804A of the outer peripheral parts 3204, 3804 which face each other. Incidentally, the portions where the UV-curing adhesive 6 is applied are a plurality of portions, for example, two portions, spaced from each other along the circumferential direction of the tip faces 3204A, 3804A.

Subsequently, the UV-curing adhesive 6 is irradiated with UV rays.

During when the UV-curing adhesive 6 is cured, the volume of the UV-curing adhesive 6 is contracted. Due to this shrinkage during curing, the first and fourth lenses 32 and 38 are pulled toward each other along the optical axis.

As a result, the second and third lenses 34, 36 are fixed in the state of being clamped between the first and fourth lenses 32, 38 through the engaging surfaces 3208, 3406, 3408, 3606, 3608, 3808.

Of the thus united first, second, third and fourth lenses 32, 34, 36, and 38, for example, as shown in FIG. 3, the outer peripheral surface 3206 of the first lens 32 is fitted in an upper inner peripheral surface 1602 of an upper small diameter part 16B, and is attached to the upper small diameter part 16B with an adhesive 4.

Incidentally, in this embodiment, the first, second, third and fourth lenses 32, 34, 36 and 38 and the UV-curing adhesive 6 constitute the mounting structure for a plurality of lenses based on the present embodiment.

Also according to the third embodiment, the exclusive-use tubular member for holding the lenses can be omitted, like in the first embodiment, so that the space that has been occupied by the tubular member can be cut down, which is advantageous from the viewpoint of downsizing. Especially, in cellular phones, there is a trend toward downsizing of the cellular phones themselves, and the camera module 10 need to be mounted into a limited space; therefore, the omission of the tubular member for exclusive use is advantageous in realizing a camera module 10 preferable for cellular phones.

In addition, the space which has been occupied by the tubular member in the related art can be used as a space for disposing a holder 16, which is advantageous from the viewpoint of effective utilization of space.

Further, since the tubular member is unnecessary, the number of component parts can be reduced, which is advantageous from the viewpoint of reducing the cost of the camera module 10.

Besides, it might be contemplated to adhere the adjacent lenses 32, 34, 36, 38 by use of an adhesive. Specifically, it might be contemplated to adhere the first lens 32 and the second lens 34 to each other with an adhesive, to adhere the second lens 34 and the third lens 36 to each other with an adhesive, and to adhere the third lens 36 and the fourth lens 38 to each other with an adhesive.

In this case, assuming that the adjacent lenses are adhered by applying an adhesive to two portions arranged in the circumferential direction, it would be necessary to apply the adhesive to a total of six portions, and to irradiate the adhesive with UV rays at the six portions.

In this embodiment, on the other hand, the four lenses 32, 34, 36, 38 can be fixed by only applying the adhesive to a total of two portions and irradiating the adhesive with UV rays at the two positions; thus, the number of steps necessary for mounting the lenses is one third, as compared with the just-contemplated case.

Manufacture of the camera module 10 is ordinarily carried out on the basis of 1,000 modules or 5,000 modules or 10,000 modules. Therefore, according to this embodiment, the number of steps necessary for mounting the lenses can be markedly cut down, which is extremely advantageous in reducing the cost of the camera module 10.

Incidentally, while the optical axes of the plurality of lenses are made to coincide with each other by engaging the engaging surfaces formed in the lenses in the embodiments described above, a configuration may be adopted in which the lenses are not provided with the engaging surfaces and the optical axes of the lenses are made to coincide with each other by use of an adjusting jig for exclusive use for this purpose.

However, when the engaging surfaces formed in the lenses are engaged with each other to thereby cause the optical axes of the lenses to coincide with each other, as in the embodiments, the operation of setting the optical axes of the lenses to coincide with each other can be carried out easily and speedily, which is advantageous in reducing the manufacturing cost.

In addition, while the case where the lenses 12, 30 are immovably attached to the holder 16 has been described in the above embodiments, the lenses 12, 30 may be disposed to be movable relative to the holder 16 in the optical axis direction.

Besides, while the case where the electronic equipment 100 in which to incorporate the camera module is a cellular phone has been described in the above embodiments, the camera module 10 based on the present embodiment is widely applicable, for example, to portable information terminals such as PDA, note-type personal computer, etc. and to various electronic equipment such as digital still camera, video camera, etc. Furthermore, the mounting structure for a plurality of lenses based on the present embodiment is widely applicable to optical systems of various apparatuses.

What is claimed is:

1. A mounting structure for a plurality of lenses, comprising at least three lenses in a stacked arrangement with their optical axes coinciding with each other, wherein:
    two lenses are located at respective ends of the stack,
    said two lenses located at the ends of the stack have parts facing each other,
    said parts facing each other of said two lenses are directly secured to each other by means of an adhesive, and
    all other lenses except said two lenses located at the ends of the stack are secured between said two lenses located at the ends of the stack by means of being clamped between said two lenses located at the ends of the stack, said other lenses not extending between said facing parts of said two lenses directly secured to each other.

2. The mounting structure for the plurality of lenses as set forth in claim 1, wherein:
    outer peripheral parts of said two lenses located at the ends of the stack are provided with annular plate parts which mutually face each other, and
    said adhesive is located on a plurality of portions spaced from each other along a circumferential direction of said mutually facing annular plate parts.

3. The mounting structure for the plurality of lenses as set forth in claim 1, wherein an outer peripheral part of each lens is provided with an engaging surface to be engaged with the adjacent lens so as to set said optical axes of said lenses to coincide with each other.

4. The mounting structure for the plurality of lenses as set forth in claim 3, wherein each said engaging part is formed as a cylindrical surface with said optical axis as a center line.

5. The mounting structure for the plurality of lenses as set forth in claim 3, wherein each said engaging part is formed as a conical surface with said optical axis as a center line.

6. The mounting structure for the plurality of lenses as set forth in claim 1, wherein an outer peripheral part of each said lens is provided with an engaging surface to be engaged with the adjacent lens to set said optical axes of said lenses to coincide with each other, and with an abutting surface brought into abutment in said optical direction.

7. The mounting structure for the plurality of lenses as set forth in claim 1, wherein said mutually facing parts of said two lenses located at the ends of the stack include inclined surfaces which incline away from each other proceeding outwards in a radial direction of said lenses.

8. The mounting structure for the plurality of lenses as set forth in claim 1, wherein said mutually facing parts of said two lenses located at the ends of the stack include planar surfaces extending on planes orthogonal to said optical axis and facing each other, and inclined surfaces which incline from each other proceeding outwards in a radial direction of said lenses.

9. The mounting structure for the plurality of lenses as set forth in claim 1, wherein outside diameters of said two lenses located at the ends of the stack are larger than outside diameter of each lens clamped between said two lenses located at the ends of the stack.

10. The mounting structure for the plurality of lenses as set forth in claim 1, wherein said adhesive is an adhesive that is curable under the influence of ultraviolet light.

11. A camera module comprising:
an imaging device; and
an imaging optical system configured to guide an image of an object to said imaging device, said imaging optical system including at least three lenses,
wherein,
said at least three lenses are arranged in a stack with their optical axes concentrically aligned with each other,
two of said lenses are located at respective ends of the stack and are provided with parts mutually facing each other,
said mutually facing parts are directly fixed to each other with an adhesive, and
all of said lenses except said two lenses located at the ends of the stack are clamped between said two lenses located at the ends of the stack, said lenses except said two lenses not extending to between said facing parts directly fixed to each other.

12. An electronic equipment comprising a camera module including:
an imaging device; and
an imaging optical system for guiding an image of an object to said imaging device,
wherein,
at least three lenses are arranged in a stack with their optical axes concentrically aligned with each other,
two of said lenses are located at respective ends of the stack and are provided with parts mutually facing each other,
said mutually facing parts are directly fixed to each other with an adhesive, and
all of said lenses except said two lenses located at the ends of the stack are clamped between said two lenses located at the ends of the stack, said lenses except said two lenses not extending to between said facing parts directly fixed to each other.

13. The electronic equipment as set forth in claim 12, wherein said electronic equipment is a cellular phone.

* * * * *